(12) United States Patent
Fan et al.

(10) Patent No.: US 9,137,474 B2
(45) Date of Patent: Sep. 15, 2015

(54) INTELLIGENT REMOTE CONTROL

(75) Inventors: James W. Fan, San Ramon, CA (US);
Jennifer K. Lam, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1010 days.

(21) Appl. No.: 12/393,817

(22) Filed: Feb. 26, 2009

(65) Prior Publication Data

US 2010/0218214 A1    Aug. 26, 2010

(51) Int. Cl.
| | |
|---|---|
| H04N 21/41 | (2011.01) |
| H04N 21/422 | (2011.01) |
| H04N 21/4227 | (2011.01) |
| H04N 5/44 | (2011.01) |
| H04N 21/4363 | (2011.01) |

(52) U.S. Cl.
CPC ......... *H04N 5/4403* (2013.01); *H04N 21/4122* (2013.01); *H04N 21/4126* (2013.01); *H04N 21/4227* (2013.01); *H04N 21/42207* (2013.01); *H04N 21/42208* (2013.01); *H04N 21/42209* (2013.01); *H04N 21/43637* (2013.01); *H04N 2005/4435* (2013.01); *H04N 2005/4442* (2013.01)

(58) Field of Classification Search
CPC .......... H04N 21/4126; H04N 21/4227; H04N 21/4122
USPC ........... 725/25, 27, 28, 30, 37–40, 43, 44, 46, 725/47, 51, 52, 58, 62, 74–78, 80, 81, 105, 725/131, 133, 135, 139, 141, 143, 153
See application file for complete search history.

(56) References Cited

U.S. PATENT DOCUMENTS

| | | | |
|---|---|---|---|
| 5,541,571 A | 7/1996 | Ochs et al. |
| 5,561,712 A | 10/1996 | Nishihara |
| 5,705,997 A | 1/1998 | Park |
| 5,724,106 A | 3/1998 | Autry et al. |
| 6,094,156 A | 7/2000 | Henty |
| 6,169,943 B1 | 1/2001 | Simon et al. |
| 6,415,094 B1 | 7/2002 | Wissman |
| 6,476,825 B1 | 11/2002 | Croy et al. |
| 6,498,567 B1 | 12/2002 | Grefenstette et al. |
| 6,704,040 B2 | 3/2004 | Sato |
| 6,819,867 B2 | 11/2004 | Mayer, Jr. et al. |
| 6,873,824 B2 | 3/2005 | Flick |
| 6,992,263 B1 | 1/2006 | Baker et al. |
| 6,992,612 B2 | 1/2006 | Pessina et al. |

(Continued)

*Primary Examiner* — Benjamin R Bruckart
*Assistant Examiner* — Jason Thomas
(74) *Attorney, Agent, or Firm* — Jackson Walker L.L.P.

(57) ABSTRACT

A disclosed remote control, suitable for use with a set top box or other form of multimedia handling device, includes a processor, a user input device, and a display. The user input device and the display are communicatively coupled to the processor. A communication adapter is configured to place the processor in bi-directional communication with the multimedia handling device. The remote control further includes a storage medium that may include a unique identifier of the user and a user profile indicative of the user's channel preferences and viewing permissions. The storage medium may further include software instructions to synchronize the user profile with a corresponding user profile on the multimedia handling device, receive input from the user via the user input device, the input including commands from the user to manipulate the multimedia handling device, and display output on the display screen in response to the user's commands.

20 Claims, 8 Drawing Sheets

(56) References Cited

U.S. PATENT DOCUMENTS

| | | |
|---|---|---|
| 7,142,932 B2 | 11/2006 | Spira et al. |
| 7,610,555 B2 | 10/2009 | Klein et al. |
| 2002/0021352 A1 | 2/2002 | Sato |
| 2002/0070712 A1 | 6/2002 | Arul |
| 2002/0098835 A1 | 7/2002 | Flick |
| 2003/0015302 A1 | 1/2003 | Pessina et al. |
| 2003/0025802 A1 | 2/2003 | Mayer, Jr. et al. |
| 2003/0070168 A1* | 4/2003 | Stone ................................ 725/37 |
| 2003/0095156 A1 | 5/2003 | Klein et al. |
| 2003/0193427 A1 | 10/2003 | Schroeder et al. |
| 2003/0206394 A1 | 11/2003 | Ossia |
| 2004/0008287 A1 | 1/2004 | Johnston et al. |
| 2004/0054757 A1 | 3/2004 | Ueda et al. |
| 2004/0106427 A1 | 6/2004 | Collavo et al. |
| 2004/0124637 A1 | 7/2004 | Shah |
| 2004/0203975 A1 | 10/2004 | Chen et al. |
| 2004/0224602 A1 | 11/2004 | Kislevitz et al. |
| 2005/0028208 A1* | 2/2005 | Ellis et al. ........................ 725/58 |
| 2005/0068789 A1 | 3/2005 | Bauer |
| 2005/0137720 A1 | 6/2005 | Spira et al. |
| 2006/0135216 A1 | 6/2006 | Collavo et al. |
| 2006/0259864 A1 | 11/2006 | Klein et al. |
| 2006/0293102 A1 | 12/2006 | Kelsey |
| 2007/0183746 A1* | 8/2007 | Haeuser et al. .................. 386/94 |
| 2007/0220553 A1* | 9/2007 | Branam et al. .................. 725/46 |
| 2007/0238481 A1 | 10/2007 | Gaucherot |
| 2007/0256100 A1* | 11/2007 | Jeong ............................. 725/40 |
| 2008/0057886 A1 | 3/2008 | Feher |
| 2008/0057929 A1 | 3/2008 | Min |
| 2008/0084389 A1 | 4/2008 | Mac |
| 2008/0134256 A1* | 6/2008 | DaCosta ........................ 725/62 |
| 2008/0180572 A1* | 7/2008 | Pickett et al. .................. 348/468 |
| 2008/0244144 A1 | 10/2008 | Choi |
| 2009/0121660 A1 | 5/2009 | Rawls-Meehan |
| 2009/0153288 A1 | 6/2009 | Hope et al. |
| 2009/0153289 A1 | 6/2009 | Hope et al. |
| 2009/0253520 A1 | 10/2009 | Lewis-Picard |
| 2009/0270085 A1* | 10/2009 | Jones et al. .................... 455/420 |
| 2009/0298535 A1 | 12/2009 | Klein et al. |
| 2010/0162294 A1* | 6/2010 | Yin et al. ........................ 725/30 |
| 2010/0169505 A1* | 7/2010 | Noguchi et al. ............... 709/231 |
| 2011/0219419 A1* | 9/2011 | Reisman ....................... 725/112 |

* cited by examiner

INTELLIGENT REMOTE CONTROL

BACKGROUND

1. Field of the Disclosure

The present disclosure relates to the field of remote controls and, more particularly, to an intelligent remote control suitable for use in conjunction with a multimedia distribution network.

2. Description of the Related Art

Prior art multimedia distribution networks often provide customer premises equipment (CPE), including a remote control useful for controlling a set-top box (STB) or other multimedia handling device (MHD). Prior art remote controls may rely on unidirectional communication over an infrared (IR) link.

DESCRIPTION OF EXEMPLARY EMBODIMENTS

Figure 1:
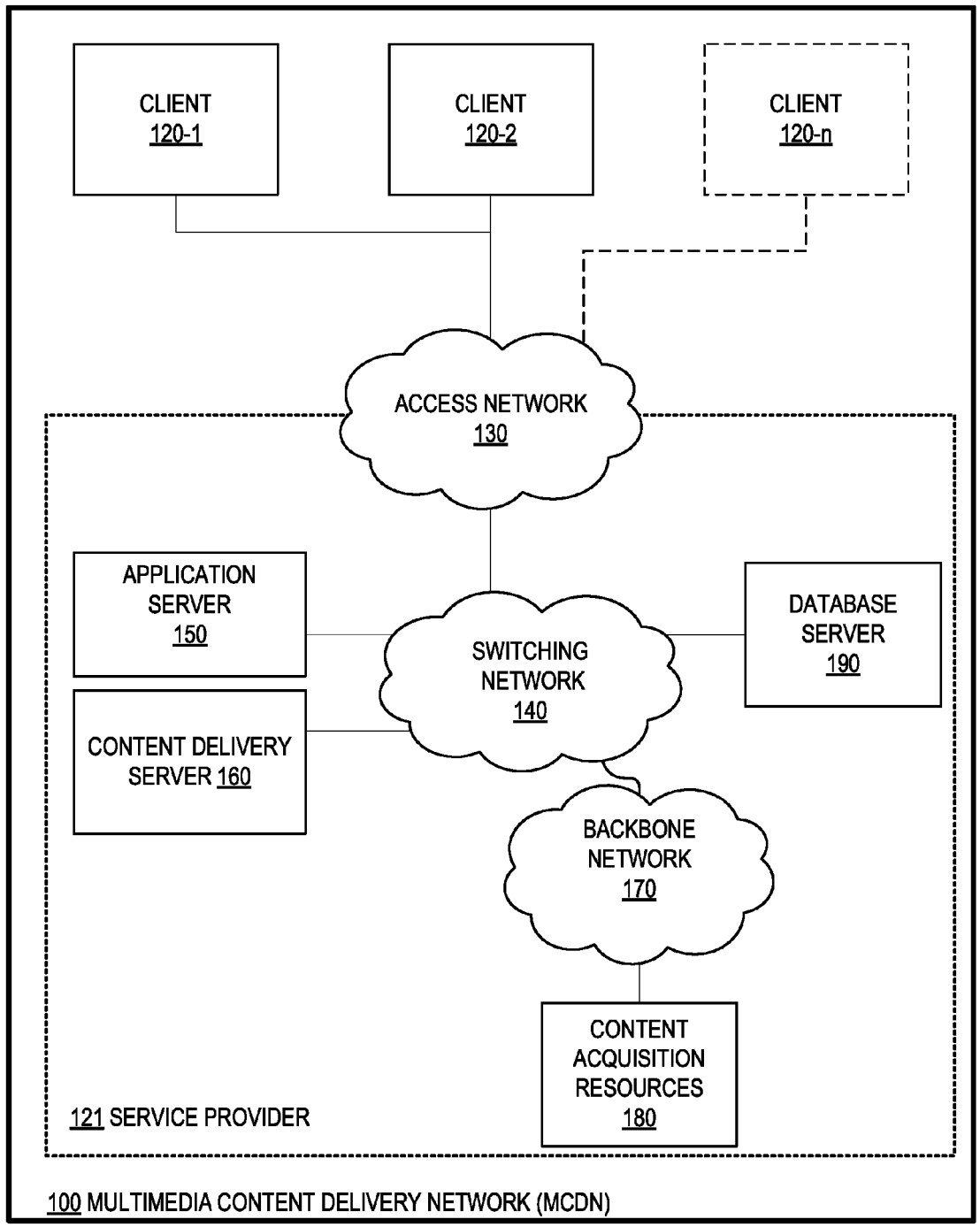
FIG. 1 is a block diagram of selected elements of an embodiment of a multimedia content distribution network (MCDN)

In a particular embodiment, a disclosed IRC provides bi-directional communication with an STB or other MHD as well as enhanced processing capabilities. The IRC may include user profiles, which may be locally stored on the IRC and which may be synchronized with the MHD.

An IRC may be a stand-alone device, or it may be an existing device adapted or re-adapted for use as an IRC. For example, a mobile telephone, smart phone, personal digital assistant (PDA), laptop computer, or other mobile device may be programmed to act as an IRC. A portable IRC may have a unique identifier (UID), which in some cases may be a globally unique identifier (GUID). A GUID enables a device to be uniquely identified from any other similar device. If a device has only a local UID, it is primarily or solely useful only with a primary MHD or a small set of MHDs at a user's primary location. However, by employing a GUID instead of a local UID, an IRC may be configured for use with any compatible MHD, including MHDs at other locations. For example, a user may visit a friend's home and use an IRC, which includes his own stored preferences, to access his friend's MHD. In other embodiments, an IRC may not store its profile locally. Instead, the user's profile may be stored on a central server accessible by compatible MHDs. In these embodiments, the MHD may use the IRC's GUID as a key for finding and downloading a "roaming" user profile.

In another aspect, a disclosed IRC has the ability to receive remote notifications. For example, an option in a user profile may be an election to receive certain notifications. Available notifications may include, for example, program notifications, emergency notifications, and caller identification (CID) forwarding. For example, a user may want to watch a television program live, but wants to be doing something else in the interim. The user can elect to receive a notification five minutes before the show starts as a reminder. Notifications could also be provided when a particular program ends, or an alarm could simply be set for a pre-selected time. If the MHD has multimedia content analysis capabilities, as described, for example, in commonly assigned and co-pending U.S. patent application Ser. No. 12/342,384, entitled Distributed Content Analysis Network, filed Dec. 23, 2008, incorporated by reference herein, a user can, for example, instruct the MHD to recognize the sportscaster on a local news station, and then receive a notification when the sports segment of the evening news starts. In another example, a user could elect to receive a text message whenever a favorite television show is broadcast, or when movies featuring a favorite actor are broadcast. Another option is the ability to receive forwarded CID information. For example, many Internet protocol television (IPTV) subscribers also subscribe to Voice over IP (VOIP) service, and may receive CID notifications on the television screen. These CID notifications could be forwarded to the IRC. Finally, an MHD could be programmed to recognize a broadcast from the U.S. Emergency Alert System (EAS) and provide a notification of the alert.

In some embodiments, a disclosed IRC may include a user-selectable display mode. Because an IRC may have a display screen, user interface screens that would otherwise be displayed on the television or other display device can be sent to the IRC. This may prevent the need of interrupting the flow of a program to interact with an electronic programming guide (EPG) or other MHD functions. The display mode can be selected from one of three available modes. First, display screen only, in which case the user interface is displayed only on the display screen of the IRC. Second, television display only, in which case the user interface is displayed only on the television or similar display device. Third, dual display, in which case the user interface is displayed on both screens.

Another useful feature of a disclosed IRC is the ability to share locally-created multimedia content with an MHD. For example, many mobile phones and other handheld devices are equipped with digital cameras useful for taking pictures and recording videos. Because some MHDs have digital video recorder (DVR) capabilities, including the ability to receive pictures and video, it may be desirable to send content created on the IRC to the MHD. The provision of a bi-directional communication link in accordance with the present disclosure enables the sharing of pictures and videos created on the IRC with the MHD.

An IRC will now be described with more particular reference to the attached drawings. In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram illustrating selected elements of an embodiment of an MCDN 100. Although multimedia content is not limited to TV, video on demand (VOD), or pay-per-view (PPV) programs, the depicted embodiments of MCDN 100 and its capabilities are primarily described herein with reference to these types of multimedia content, which are interchangeably referred to herein as multimedia content, multimedia content program(s), multimedia programs or, simply, programs.

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 170, as well as application server 150, database server 190, and content delivery server 160, also shown connected to switching network 140.

Access network 130 demarcates clients 120 and service provider 121, and provides connection path(s) between clients 120 and service provider 121. In some embodiments, access network 130 is an Internet protocol (IP) compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twist pair cables, fiber optic cables, or a combination thereof. MCDN 100 may include digital subscribe line (DSL) compliant twisted pair connections between clients 120 and a node (not depicted) in access network 130 while fiber, cable or another broadband medium connects service provider resources to the node. In other embodiments, the broadband cable may extend all the way to clients 120.

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL compliant connections, switching network 140 may include elements of a DSL Access Multiplexer (DSLAM) that multiplexes many subscriber DSLs to backbone network 170.

In FIG. 1, backbone network 170 represents a private network including, as an example, a fiber based network to accommodate high data transfer rates. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using an EPG, such as EPG 316 described below with respect to FIG. 3. Accordingly, a user of MCDN 100 may be able to browse scheduled programming well in advance of the broadcast date and time. Some scheduled programs may be "regularly" scheduled programs, which recur at regular intervals or at the same periodic date and time (i.e. daily, weekly, monthly, etc.). Programs which are broadcast at short notice or interrupt scheduled programs are referred to herein as "unscheduled programming."

Acquired content is provided to content delivery server 160 via backbone network 170 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for multimedia content delivery network 100. Application server 150 may be any data processing system with associated software that provides applications for clients or users. Application server 150 may provide services including multimedia content services, e.g., EPGs, DVR, VOD, or PPVs, IPTV portal, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include program interruption application 152, which, as will be described in detail below, is configured to respond to interruptions of desired programs included in the multimedia content provided to client 120 of MCDN 100.

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata used to identify the beginning and the end of program interruptions for clients 120, as will be discussed in detail below.

Figure 2:
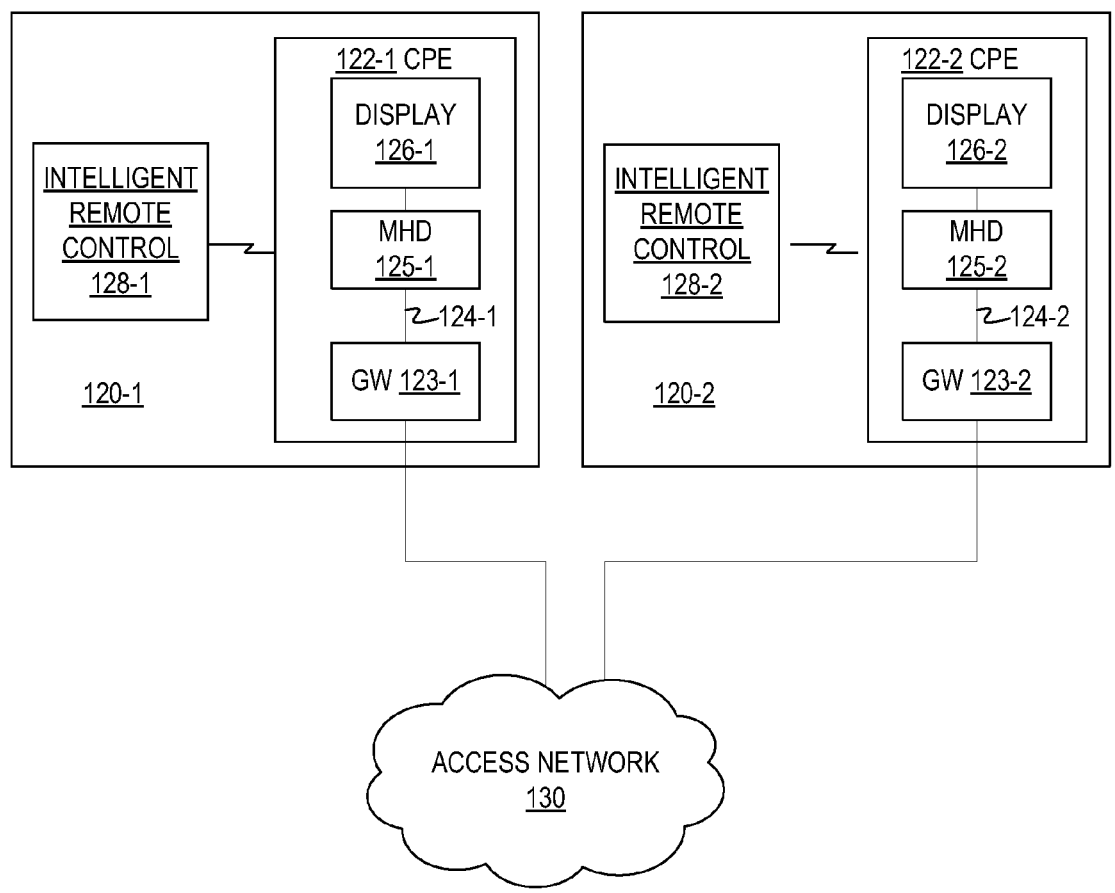
FIG. 2 is a block diagram of selected elements of an embodiment of an MCDN.

FIG. 2 is a block diagram of selected elements of an embodiment of a multimedia distribution network emphasizing the clients 120 and access network 130 depicted in FIG. 1. Clients 120 are shown in additional detail with respect to access network 130. Clients 120 may include network appliances collectively referred to herein as CPE 122. In the depicted embodiment, CPE 122 includes the following devices: gateway (GW) 123, MHD 125, and display device 126. Any combination of GW 123, MHD 125, and display device 126 may be integrated into a single physical device. Thus, for example, CPE 122 might include a single physical device that integrates GW 123, MHD 125, and display device 126. As another example, MHD 125 may be integrated into display device 126, while GW 123 is housed within a physically separate device.

In FIG. 2, GW 123 provides connectivity for client 120 to access network 130. GW 123 may provide an interface and conversion function between access network 130 and client-side LAN 124. GW 123 may include elements of a conventional DSL or cable modem. GW 123, in some embodiments, may further include routing functionality for routing multimedia content, conventional data content, or a combination of both in compliance with IP or another network layer protocol. In some embodiments, LAN 124 may encompass or represent an IEEE 802.3 (Ethernet) LAN, an IEEE 802.11-type (WiFi) LAN, or a combination thereof. GW 123 may still further include WiFi or another type of wireless access point to extend LAN 124 to wireless-capable devices in proximity to GW 123. GW 123 may also provide a firewall (not depicted) between clients 120 and access network 130.

Clients 120 as depicted in FIG. 2 further include a display device or, more simply, a display 126. Display 126 may be implemented as a TV, a liquid crystal display screen, a computer monitor, or the like. Display 126 may comply with a display standard such as National Television System Committee (NTSC), Phase Alternating Line (PAL), or another suitable standard. Display 126 may include one or more integrated speakers to play audio content.

Clients 120 are further shown with their respective remote control 128, which is configured to control the operation of MHD 125 by means of a user interface (not shown in FIG. 2) displayed on display 126. Remote control 128 of client 120 is operable to communicate requests or commands wirelessly to MHD 125 using IR or radio frequency (RF) signals. MHDs 125 may also receive requests or commands via buttons (not depicted) located on side panels of MHDs 125.

MHD 125 is enabled and configured to process incoming multimedia signals to produce audio and visual signals suitable for delivery to display 126 and any optional external speakers (not depicted). Incoming multimedia signals received by MHD 125 may be compressed and/or encrypted, digital or analog, packetized for delivery over packet switched embodiments of access network 130 or modulated for delivery over cable-based access networks. In some embodiments, MHD 125 may be implemented as a standalone STB suitable for use in a co-axial or IP-based MCDN.

Figure 3:
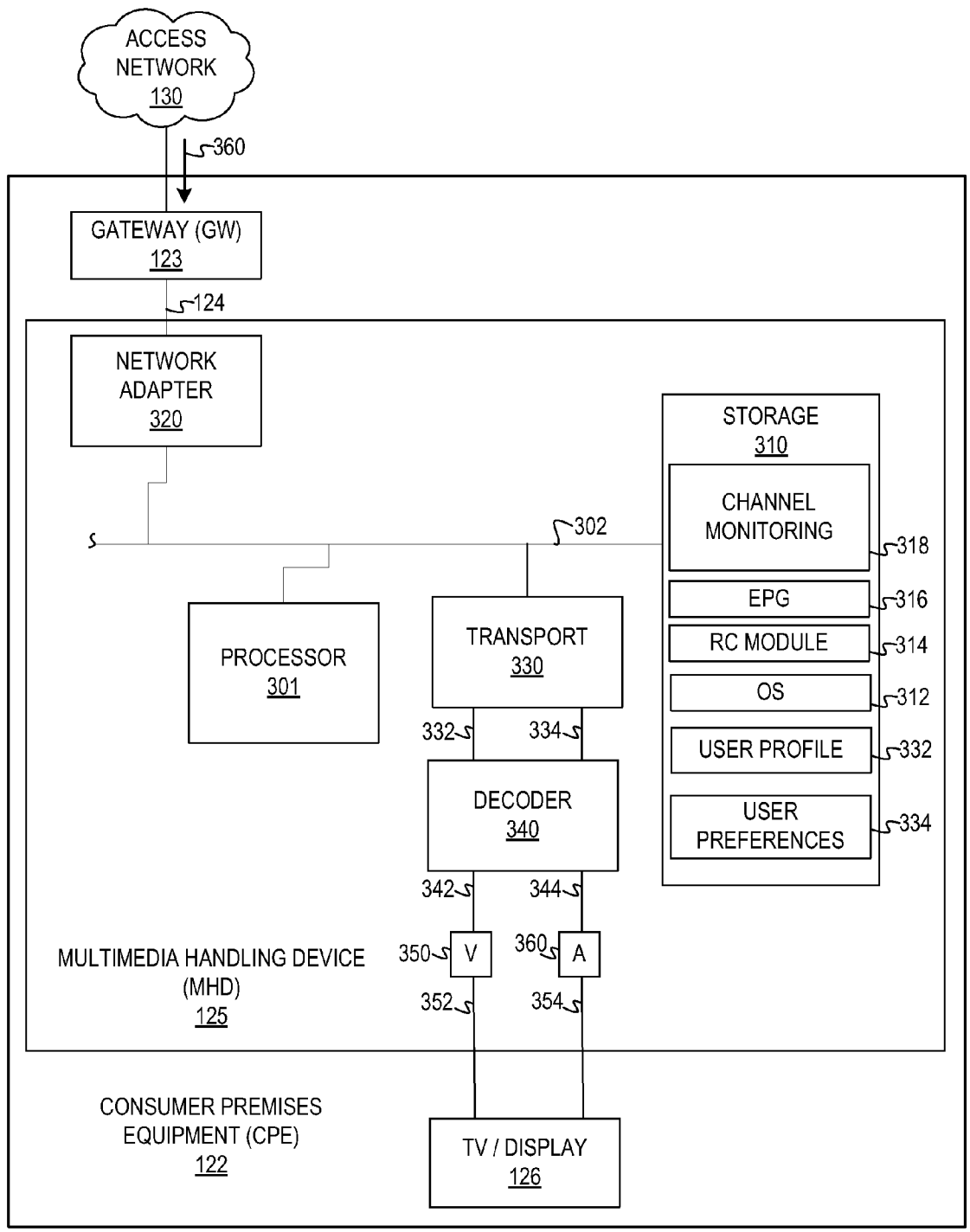
FIG. 3 is a block diagram of selected elements of an embodiment of an MHD.

FIG. 3 is a block diagram illustrating selected elements of an embodiment of MHD 125. In FIG. 3, MHD 125 is shown as a functional component of CPE 122 along with GW 123 and display 126, independent of any physical implementation, as discussed above with respect to FIG. 2. In particular, it is noted that CPE 122 may be any combination of GW 123, MHD 125 and display 126.

In the embodiment depicted in FIG. 3, MHD 125 includes processor 301 coupled via shared bus 302 to storage media collectively identified as storage 310. MHD 125, as depicted in FIG. 3, further includes network adapter 320 that interfaces MHD 125 to LAN 124 and through which MHD 125 receives multimedia content 360. GW 123 is shown providing a bridge between access network 130 and LAN 124, and receiving multimedia content 360 from access network 130.

In embodiments suitable for use in IP based content delivery networks, MHD 125, as depicted in FIG. 3, may include transport unit 330 that assembles the payloads from a sequence or set of network packets into a stream of multimedia content. In coaxial based access networks, content may be delivered as a stream that is not packet-based and it may not be necessary in these embodiments to include transport unit 330. In a co-axial implementation, however, clients 120 may require tuning resources (not explicitly depicted in FIG. 3) to "filter" desired content from other content that is delivered over the coaxial medium simultaneously and these tuners may be provided in MHDs 125. The stream of multimedia content received by transport unit 330 may include audio information and video information and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, Windows Media Video (WMV) standards including WMV 9, which has been standardized as Video Codec-1 (VC-1) by the Society of Motion Picture and Television Engineers. Similarly decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 360 respectively to produce analog video and audio signals 352 and 354 in a format compliant with display 126, which itself may not be a part of MHD 125. Display 126 may comply with NTSC, PAL or any other suitable television standard.

Storage 310 encompasses persistent and volatile media, fixed and removable media, and magnetic and semiconductor media. Storage 310 is operable to store instructions, data, or both. Storage 310 as shown includes sets or sequences of instructions, namely, an operating system 312, a remote control application program identified as RC module 314, EPG 316, and channel monitoring 318. Operating system 312 may be a UNIX or UNIX-like operating system, a Windows® family operating system, or another suitable operating system. In some embodiments, storage 310 is configured to store and execute instructions provided as services to client 120 by application server 150, as mentioned previously.

User profile 332 includes channel preferences and channel permissions. In some embodiments, user profile 332 may be selected from among three types of profiles. The first type of profile is called the "default profile," which is a pre-defined profile based on features/channels subscribed to. This is the default configuration of the IRC. The second type of profile is a "regular profile," which is a content-restricted profile. A regular profile will include some subscribed channels, but will be restricted from accessing channels and programs that are potentially offensive (based, for example, on rating). Users with access to a regular profile may further customize the profile to exclude channels or other content they are not interested in. The third type of profile is called an "advanced profile." An advanced profile has access to all stations and content, and may start out with everything made available by the default profile. An advanced user may customize the profile to exclude channels or other content he or she is not interested in. After a regular profile or advanced profile is customized, it may be saved as the default profile for that particular IRC, though the original default profile may be saved in a backup location in case the user wants to reset the IRC to its original configuration. Storage 310 also includes user preferences 334, which may store additional user preferences such as languages, closed captioning, and preferred format.

EPG 316 represents a guide to the multimedia content provided to client 120 via MCDN 100, and may be shown to the user as an element of the user interface. The user interface may include a plurality of menu items arranged according to one or more menu layouts, which enable a user to operate MHD 125. The user may operate the user interface, including EPG 316, using remote control 128 (see FIG. 2) in conjunction with RC module 314.

Figure 4:
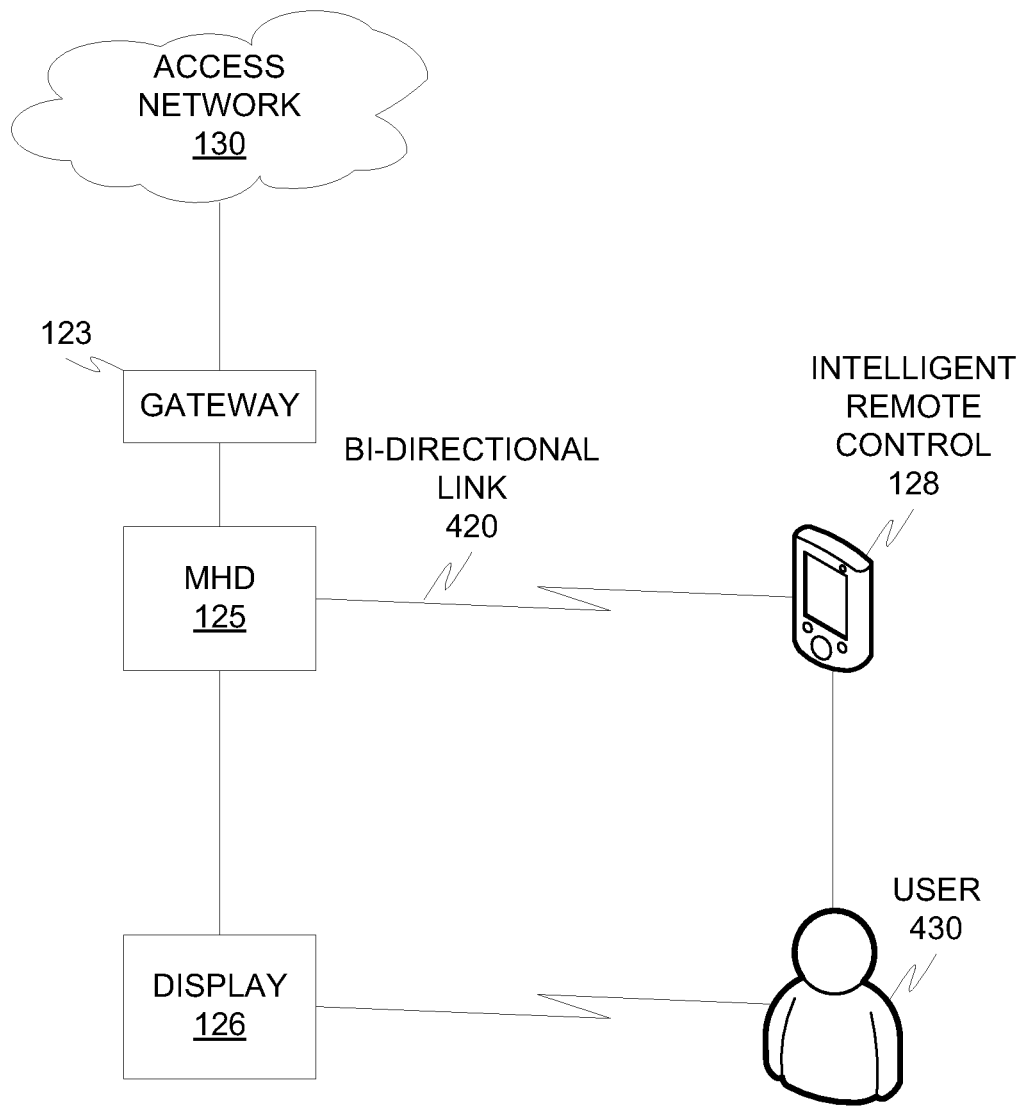
FIG. 4 is a network diagram showing selected elements of an MCDN, in which a user interacts with an intelligent remote control (IRC)
Figure 7:
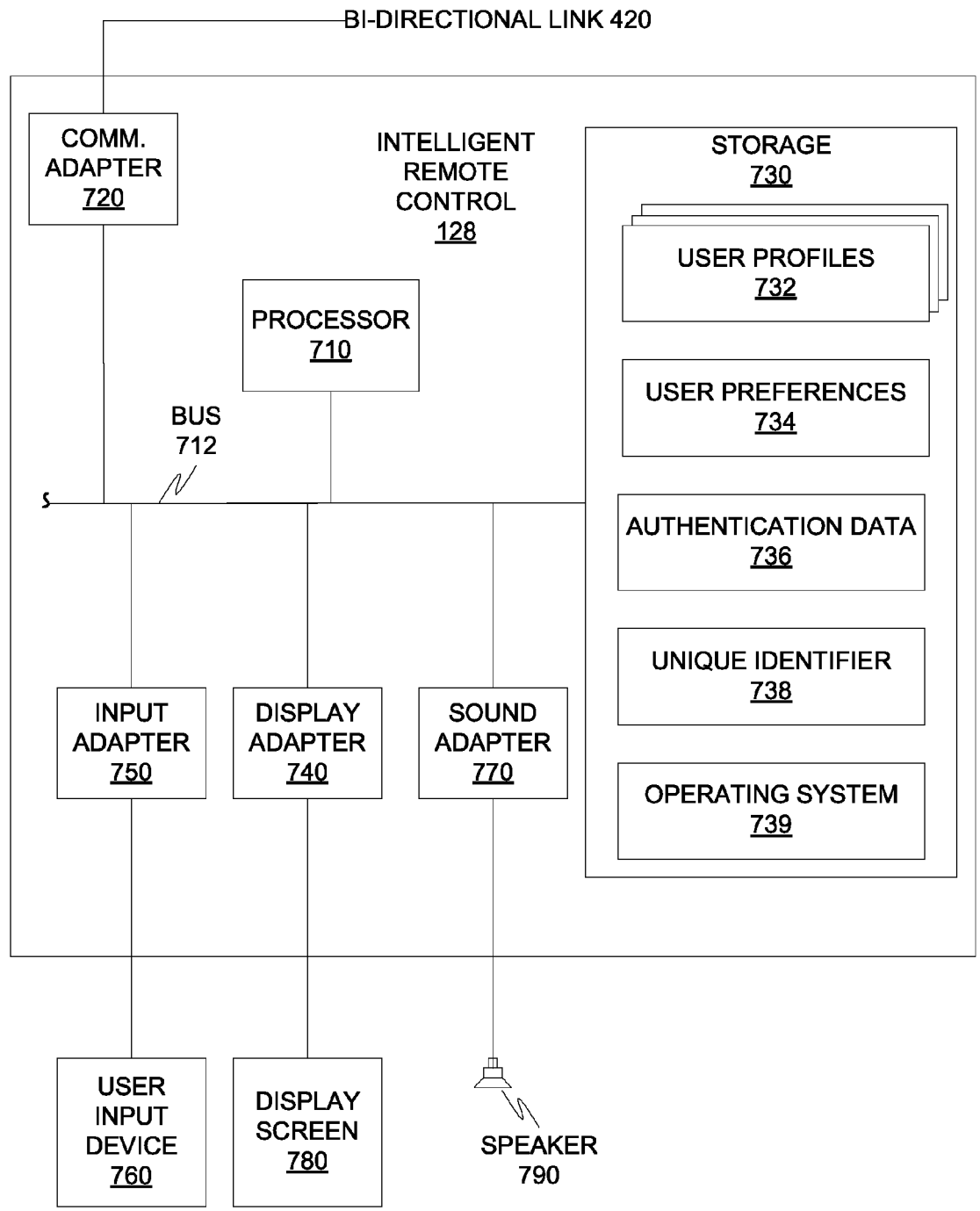
FIG. 7 is a block diagram illustrating selected elements of an embodiment of an IRC.

FIG. 4 is a network diagram showing selected elements of an embodiment of MCDN 100, in which a user 430 interacts with an IRC 128. User 430 watches display 126, which may be a television or other similar device. User 430 may manipulate IRC 128 via a user input device 760 (FIG. 7), receiving visual feedback via a display screen 780 (FIG. 7) and audio feedback via a speaker 790 (FIG. 7). IRC 128 communicates with MHD 125 over a bi-directional link 420. Bi-directional link 420 may be one of several well-known protocols that permit two devices to interact wirelessly. For example, at very short ranges, a bi-directional IR link may be usable. Per Infrared Data Association (IrDA) standards, IR links may have a maximum range of 0.2 m to 1.0 m at speeds of up to 16 Mb/s. Other short-range applications may employ a Bluetooth interface, which depending on the class of device, may provide a maximum range between 1 m and 100 m, and a maximum data rate between 1 Mb/s and 480 Mb/s. Another option is a wireless connection under one of the IEEE 802.11 standards, which provide typical data rates between 11 Mb/s and 140 Mb/s and ranges from approximately 30 m to 100 m or more. By employing a bi-directional link 440, IRC 128 is enabled to provide a richer feature set than a uni-directional remote control.

MHD receives a multimedia content stream from access network 130 through gateway 123. This content stream may be provided to display 126. In some embodiments, bi-directional link 420 may enable MHD 125 to also provide multimedia content to IRC 128, so that user can view the content when temporarily away from display 126.

Figure 5:
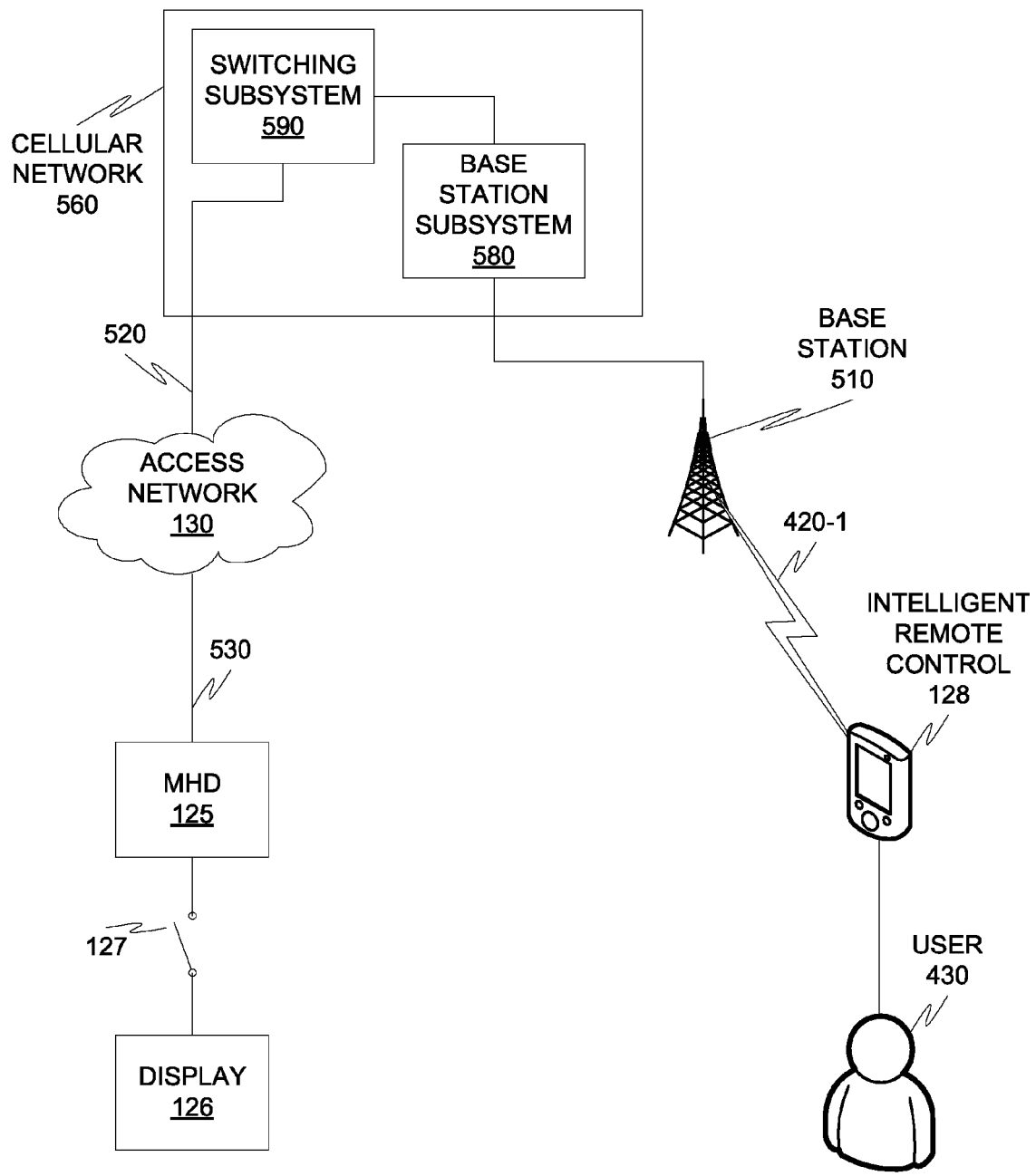
FIG. 5 is a network diagram showing selected elements of an MCDN, in which the bi-directional link is provided by a cellular internet link.

FIG. 5 is a network diagram showing selected elements of an embodiment of MCDN 100, in which bi-directional link 420 is implemented as a cellular internet link 420-1. In this case, IRC 128 may be a mobile telephone, smart phone, PDA, personal computer, laptop computer, or other internet-capable device. User 430 interacts with IRC 128 as before. IRC 128 communicates with a base station 510 over cellular internet link 420-1. Base station 510 routes traffic to a cellular network 560, including a base station subsystem 580 in communication with base station 510, and a switching subsystem 590 in communication with base station subsystem 580. Switching subsystem 590 connects cellular network 560 to access network 130 over a broadband connection 520. MHD 125 communicates with access network 130 through a secure connection 530. Secure connection 530 is required because MHD 125 is exposed to the entire access network 130, and may be secured by authentication, encryption, or other security techniques known in the art.

In the embodiment shown, a switch 127 between display 126 and MHD 125 is in its "off" position. This arrangement illustrates that with bi-directional link 420 user 430 may use IRC 128 to interact with an EPG 316 (FIG. 3) or other features of MHD 125 even when display 126 is not used.

Although FIG. 5 illustrates a wireless internet connection, it is also possible to provide the same functionality over a wired broadband internet connection to a personal computer.

Figure 6:
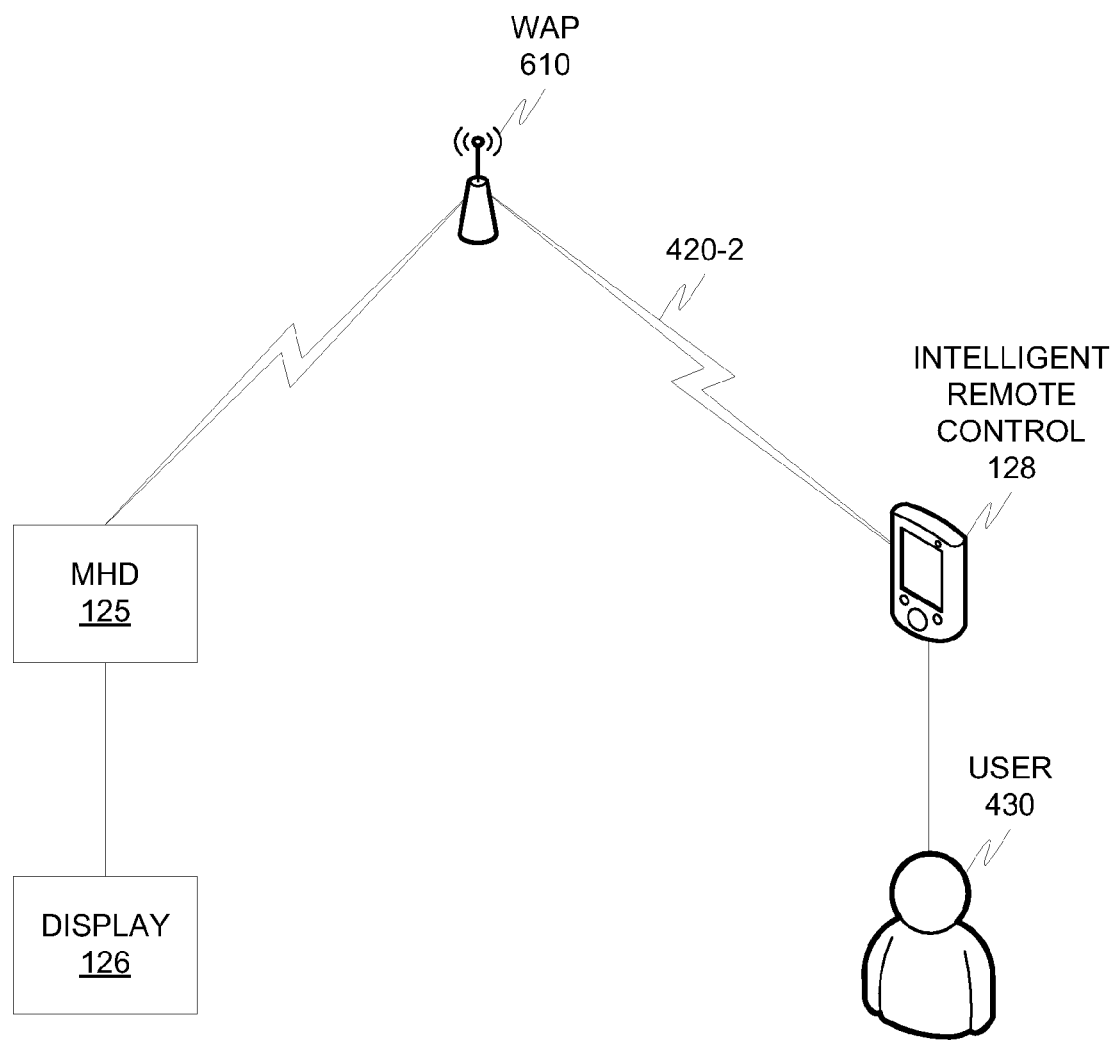
FIG. 6 is a network diagram illustrating selected elements of an MCDN wherein a bi-directional link is embodied as a wireless local area network (LAN)

FIG. 6 is a network diagram illustrating selected elements of an embodiment of a MCDN-n 100 wherein bi-directional link 420 is embodied as a wireless local area network (WLAN) 420-2. In this case, user 430 interacts with IRC 128, which is connected to a wireless access point (WAP) 610 over a WLAN connection. WAP 610 may provide a wireless sub-network that includes IRC 128 and MHD 125 as nodes. In this case, it may not be necessary to secure the connection between IRC 128 and MHD 125 because local network traffic can be isolated by a firewall. In some embodiments, it may still be necessary for IRC 128 to authenticate itself to MHD 125 so that MHD 125 can determine which user profile to work from.

FIG. 7 is a block diagram illustrating selected elements of an embodiment of an IRC 128. The IRC as depicted in FIG. 7 128 is controlled by a processor 710, which connects to other elements via a data bus 712. A communications adapter 720 is communicatively coupled to bi-directional link 420, and is configured to translate messages between processor 710 and bi-directional link 420. An input adapter 750 is configured to receive inputs from user input device 760, which may include a keyboard or other buttons, a stylus and touch screen, or other input methods known in the art. Display adapter 740 receives display information, which it formats for use with display screen 780. Sound adapter 770 receives audio information and formats it for use with speaker 790.

Storage 730 may encompass both volatile and non-volatile memory, or some combination thereof. An operating system 739 is provided to provide low-level functions, and may be a commonly-used embedded operating system such as Unix, Linux, Microsoft Windows® Embedded, or VxWorks®. User profiles 732 is a local copy of user profile 332 provided by MHD 125. User preferences 734 is a local copy of user preferences 334 in MHD 125. User profiles 732 and user preferences 734 may be synchronized with MHD 125 upon connection or as necessary. Authentication data 736 may include data that identifies IRC 128 to MHD 125. This may be a UID 738 assigned to IRC 128. Authentication data 736 may also include data identifying a specific user profile. In some cases, a UID may be a GUID, meaning that the UID is globally unique. A GUID would permit IRC 128 to be used with any compatible MHD 125. For example, a user who owns IRC 128 may visit a friend who has a compatible MHD 125 able to access MCDN 100. With a GUID, IRC 128 may be enabled to interface with compatible MHD 125, and the user may then access programs according to his stored preferences.

Figure 8:
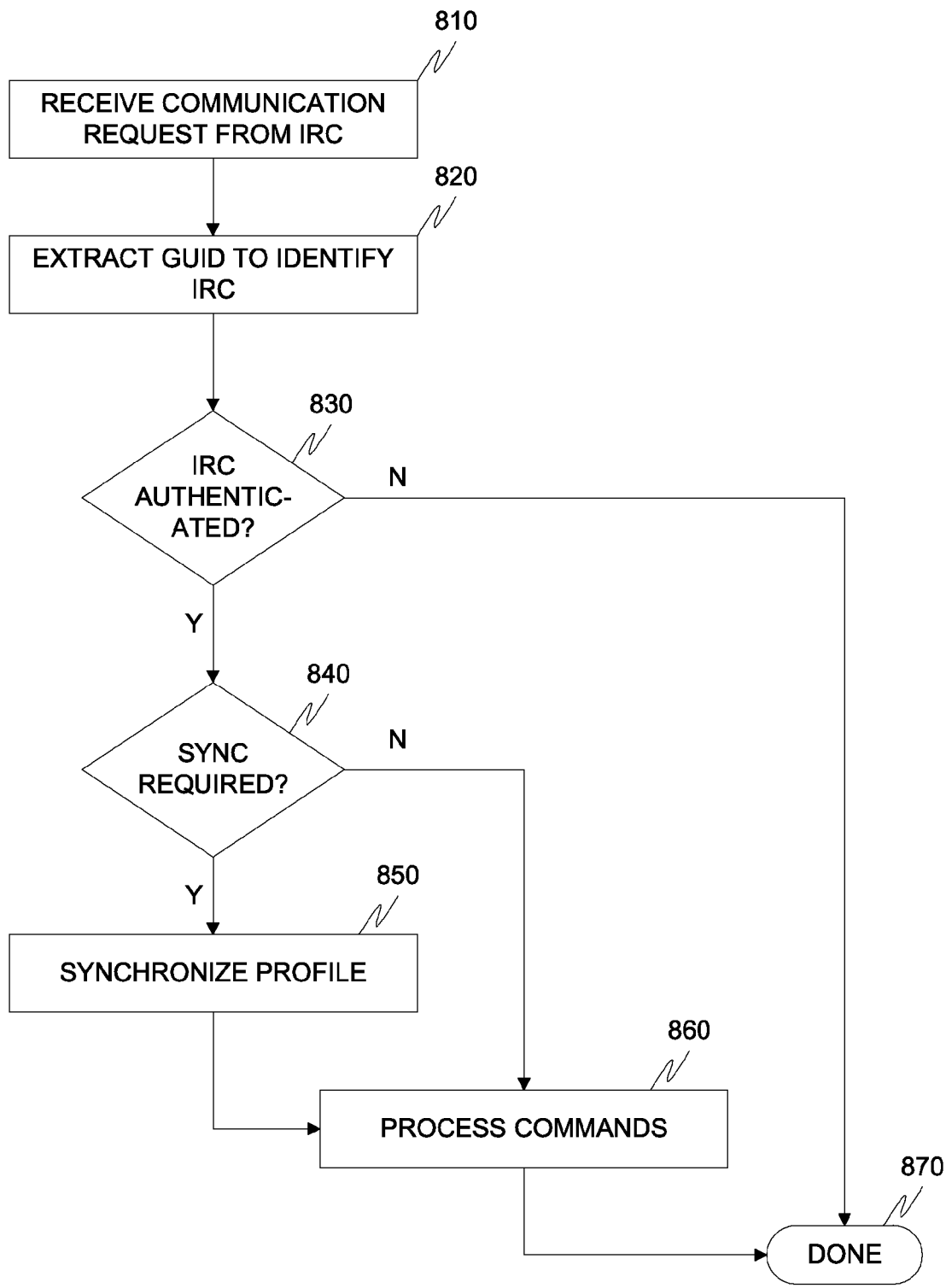
FIG. 8 is a flow chart disclosing selected elements of an embodiment of a method enabling an IRC interacting with an MHD.

FIG. 8 is a flow chart disclosing selected aspects of a method of an IRC 128 interacting with an MHD 125. In block 810, MHD 125 receives a communication request from IRC 128. The communication request may include a header or other data packet that provides a UID or GUID. In block 820, the UID or GUID is extracted so that MHD 125 can identify IRC 128 and determine, in block 830, whether IRC 128 is authorized to connect. If IRC 128 is not authorized to connect, no further action is taken and the process is terminated in block 870. If the IRC is authenticated, in block 840, MHD 125 determines whether synchronization is required with IRC 128. If synchronization is not required, the MHD 125 immediately starts processing commands in block 860. If synchronization is required, then in block 850 the synchronization is performed, after which the MHD 125 starts processing commands in block 860. MHD 125 continues to process commands according to block 860 until the interaction is completed (for example, when a timer times out after not receiving a command for a specified period, or when an explicit termination signal is received), after which the process terminates in block 870.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. An intelligent remote control for use with a multimedia handling device, the intelligent remote control comprising:
    a processor;
    a user input device communicatively coupled to the processor via an input adapter;
    a display screen communicatively coupled to the processor via a display adapter;
    a speaker communicatively coupled to the processor via a sound adapter;
    a communication adapter, communicatively coupled to the processor, to place the processor in bi-directional communication with a multimedia handling device via a bi-directional link comprising a cellular link between the intelligent remote control and a cellular base station; and
    a storage medium including:
        stored data, comprising:
            a unique identifier identifying a user;
            user preferences including a user language preference, a user closed captioning preference, and a user preferred format preference; and
            a user profile indicative of channel preferences and viewing permissions of the user; and
        instructions that, when executed by a processor, cause the processor to perform operations comprising:
            synchronizing the user profile and the user preferences with a corresponding user profile and corresponding user preferences on the multimedia handling device;
            receiving input from the user via the user input device, the input comprising commands from the user to manipulate the multimedia handling device;
            sending a user-selectable display mode instruction to the multimedia handling device, the user-selectable display mode being selected from the group consisting of display screen only, television display only, and display screen and television display, wherein display screen only mode indicates that output from the multimedia handling device is sent only to the display screen on the intelligent remote control, television display only mode indicates that output from the multimedia handling device is sent only to a television display connected to the multimedia handling device, and display screen and television display mode indicates that output should be sent from the multimedia handling device both directly to the display screen on the intelligent remote control and directly to the television display;
            sending a user-selectable content mode instruction to the multimedia handling device, the user-selectable content mode being selected from the group consisting of display all content only and display commercial-free content only, wherein display all content only mode indicates that output from the multimedia handling device should include all content and display commercial-free content only indicates that output from the multimedia handling device should not include program interruptions;
            providing an interactive display in accordance with the display mode instruction and the content mode instruction; and
            displaying on the intelligent remote control notification messages from the multimedia handling device, wherein the notification messages include a change in content status of a multimedia program based on the multimedia handling device receiving the content mode instruction.

2. The intelligent remote control of claim 1 wherein the unique identifier is a globally unique identifier, and wherein the intelligent remote control is usable with any compatible multimedia handling device.

3. The intelligent remote control of claim 1 wherein the operations include:
    creating local multimedia content; and
    sending the local multimedia content to the multimedia handling device.

4. The intelligent remote control of claim 1 wherein the notification messages further include forwarded caller identification messages.

5. The intelligent remote control of claim 1 wherein the notification messages include notifications of the beginning and ending of a multimedia television program.

6. The intelligent remote control of claim 1 wherein the notification messages include further emergency notifications.

7. The intelligent remote control of claim 1 wherein the operations include instructing the multimedia handling device to display an electronic programming guide on the display screen of the intelligent remote control.

8. The intelligent remote control of claim 1 wherein the bi-directional link is a secure internet connection, and wherein the user is enabled to interact with the multimedia handling device via a web browser.

9. The intelligent remote control of claim 1 wherein the storage medium includes a plurality of profiles.

10. The intelligent remote control of claim 9 wherein the plurality of profiles includes a profile selected from the group consisting of:
    a default profile, the default profile being based on available features and channels;
    a regular profile, the regular profile blocking potentially-objectionable content; and
    an advanced profile, the advanced profile providing access to potentially-objectionable content.

11. A mobile telephone configured to perform the method of claim 1.

12. A non-transitory computer-readable storage medium including stored, processor executable instructions that, when executed by a processor, cause the processor to perform operations comprising:

processing a signal from an intelligent remote control, the signal including a unique identifier;

obtaining user preferences for language, closed captioning and preferred format;

obtaining a user profile associated with the unique identifier;

providing the user profile to the intelligent remote control over a bi-directional communication link including a cellular link between the intelligent remote control and a cellular base station;

receiving a display mode instruction from the intelligent remote control, the display mode being selected from the group consisting of display screen only, television display only, and display screen and television display, wherein display screen only mode indicates that output from a multimedia handling device is sent only to a display screen on the intelligent remote control, television display only mode indicates that output from the multimedia handling device is sent only to a television display connected to the multimedia handling device, and display screen and television display mode indicates that output from the multimedia handling device is sent both directly to the display screen and directly to the television display;

receiving a content mode instruction from the intelligent remote control, the content mode being selected from the group consisting of display all content only and display commercial-free content only, wherein display all content only mode indicates that output from the multimedia handling device should include all content and display commercial-free content only indicates that output from the multimedia handling device should not include program interruptions;

providing an interactive display in accordance with the display mode instruction and the content mode instruction; and providing to the intelligent remote control notification messages from the multimedia handling device, wherein the notification messages include a change in content status of a multimedia program based on the multimedia handling device receiving the content mode instruction.

13. The storage medium of claim 12 wherein the operations include receiving multimedia content from the intelligent remote control.

14. The storage medium of claim 12 wherein the notification messages include an incoming caller identification.

15. The storage medium of claim 12 wherein the notification messages include an emergency event notification.

16. The storage medium of claim 12 wherein the notification messages include a change in the status of a multimedia program.

17. An intelligent remote control for controlling a multimedia handling device, the intelligent remote control comprising:

a processor;

a communication adapter communicatively coupled to the processor and configured to place the processor in bi-directional communication with a multimedia handling device via a bi-directional link wherein the bi-directional link includes a cellular link between the intelligent remote control and a cellular base station; and a storage medium including instructions that, when executed by a processor, cause the processor to perform operations comprising:

maintaining an individual profile including channel preferences and viewing permissions, the individual profile being tied to a global unique identifier;

creating local multimedia content;

sending the locally created multimedia content to the multimedia handling device and instructing the multimedia handling device to store the locally created multimedia content;

sending a user-selectable display mode instruction indicating a display mode to the multimedia handling device, the user-selectable display mode being selected from a display screen only mode, a television display only mode, and a display screen and television display mode, wherein the display screen only mode indicates that output from the multimedia handling device is sent only to a display screen on the intelligent remote control, the television display only mode indicates that output from the multimedia handling device is sent only to a television display connected to the multimedia handling device, and display screen and television display mode indicates that output from the multimedia handling device is sent both directly to the display screen and directly to the television display;

sending a user-selectable content mode instruction indicating a content mode to the multimedia handling device, the user-selectable content mode being selected from the group consisting of display all content only and display commercial-free content only, wherein display all content only mode indicates that output from the multimedia handling device should include all content and display commercial-free content only indicates that output from the multimedia handling device should not include program interruptions;

providing an interactive display in accordance with the display mode instruction and the content mode instruction; and receiving from the multimedia handling device notification of an event, the event including a change in content status of a multimedia program based on the multimedia handling device receiving the content mode instruction.

18. The intelligent remote control of claim 17 wherein the storage medium further includes instructions executable by the processor to provide a user-selectable display mode for control functions, the display mode being selected from the group consisting of: display screen only, television display only, and dual display.

19. A method, comprising:

processing a signal from an intelligent remote control, the signal including a unique identifier;

obtaining user preferences for language, closed captioning and preferred format;

obtaining a user profile associated with the unique identifier;

providing the user profile to the intelligent remote control over a bi-directional communication link including a cellular link between the intelligent remote control and a cellular base station;

receiving a display mode instruction from the intelligent remote control, the display mode being selected from the group consisting of display screen only, television display only, and display screen and television display, wherein display screen only mode indicates that output from a multimedia handling device is sent only to a display screen on the intelligent remote control, television display only mode indicates that output from the multimedia handling device is sent only to a television display connected to the multimedia handling device, and display screen and television display mode indicates that output from the multimedia handling device is sent both directly to the display screen and directly to the television display;

receiving a content mode instruction from the intelligent remote control, the content mode being selected from the group consisting of display all content only and display commercial-free content only, wherein display all content only mode indicates that output from the multimedia handling device should include all content and display commercial-free content only indicates that output from the multimedia handling device should not include program interruptions;

providing an interactive display in accordance with the display mode instruction and the content mode instruction; and providing to the intelligent remote control notification messages from the multimedia handling device, wherein the notification messages include a change in content status of a multimedia program based on the multimedia handling device receiving the content mode instruction.

20. The method of claim 19, wherein the operations include receiving multimedia content from the intelligent remote control.

* * * * *